(12) United States Patent
Kerestecioglu et al.

(10) Patent No.: US 9,795,916 B2
(45) Date of Patent: Oct. 24, 2017

(54) PROCESS AND APPARATUS FOR SEPARATING METAL CARBONYLS FROM GAS MIXTURES

(71) Applicant: LINDE AKTIENGESELLSCHAFT, Munich (DE)

(72) Inventors: Ulvi Kerestecioglu, Geltendorf (DE); Thomas Haberle, Gmund-Durnbach (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 488 days.

(21) Appl. No.: 14/307,685

(22) Filed: Jun. 18, 2014

(65) Prior Publication Data
US 2014/0366728 A1 Dec. 18, 2014

(30) Foreign Application Priority Data
Jun. 18, 2013 (DE) .................. 10 2013 010 103

(51) Int. Cl.
*B01D 53/14* (2006.01)
*B01D 53/18* (2006.01)

(52) U.S. Cl.
CPC ..... *B01D 53/1425* (2013.01); *B01D 53/1487* (2013.01); *B01D 53/18* (2013.01); *B01D 2257/706* (2013.01)

(58) Field of Classification Search
CPC .......... B01D 2257/706; B01D 53/1425; B01D 53/14; B01D 53/00; B01D 53/1487; B01D 53/18
See application file for complete search history.

(56) References Cited

U.S. PATENT DOCUMENTS 6,488,742 B1 * 12/2002 Grunewald ........ B01D 53/1425
95/173
2013/0266997 A1 * 10/2013 Hickey ..................... C12P 7/16
435/140

FOREIGN PATENT DOCUMENTS

DE 102007055296 A1 * 5/2009 ......... B01D 53/1425

OTHER PUBLICATIONS

DE 102007055296 A1 Machine Translation accessed on Jun. 19, 2016.*

* cited by examiner

*Primary Examiner* — Duane Smith
*Assistant Examiner* — Cabrena Holecek
(74) *Attorney, Agent, or Firm* — Millen White Zelano & Branigan, PC

(57) ABSTRACT

The invention relates to a process and an apparatus for separating metal carbonyls from a gas mixture (1) by gas scrubbing with a physically acting scrubbing medium (6), where scrubbing medium (8) loaded with metal carbonyls in the scrub (W) is regenerated and is subsequently reused for separating off metal carbonyls. The invention is characterized in that in order to regenerate the loaded scrubbing medium (8) materials dissolved in the scrubbing medium are separated off only to the extent necessary for removal of the metal carbonyls.

13 Claims, 1 Drawing Sheet

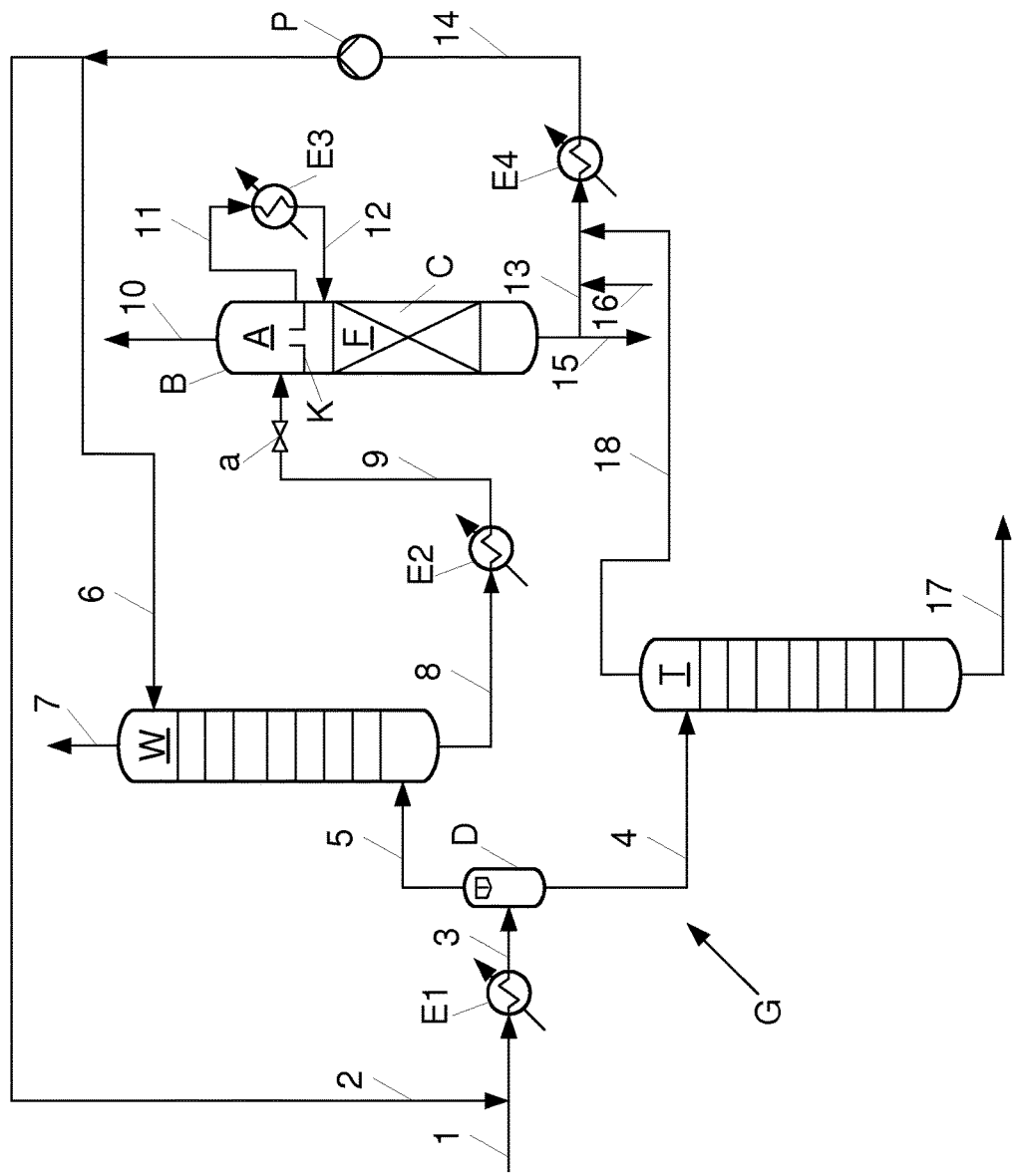

PROCESS AND APPARATUS FOR SEPARATING METAL CARBONYLS FROM GAS MIXTURES

FIELD OF THE INVENTION

The invention relates to a process for separating metal carbonyls from a gas mixture by gas scrubbing with a physically acting scrubbing medium, where scrubbing medium loaded with metal carbonyls in the scrub is regenerated and is subsequently reused for separating off metal carbonyls.

The invention further relates to an apparatus for carrying out the process.

To be able to utilize carbon-containing solids and liquids for operation of a gas turbine, these materials are, according to the prior art, converted in a first process step by gasification into a cracking gas which contains not only the desired constituents hydrogen ($H_2$), carbon monoxide (CO) and carbon dioxide ($CO_2$) but also a series of undesirable constituents such as hydrogen sulphide ($H_2S$), carbonyl sulphide (COS) or hydrogen cyanide (HCN). A fuel gas suitable for use in a gas turbine is produced from the cracking gas in subsequent process steps by, first and foremost, removal of the undesirable constituents. Here, very complete removal of the sulphur components is sought, since firstly these would lead to damage to the gas turbines and secondly applicable emission standards in the turbine exhaust gas have to be adhered to. At the same time, it is desirable to leave the carbon dioxide very substantially in the gas mixture since it is required as temperature moderator and working medium in the gas turbine.

Particularly when the cracking gas is produced under high pressure from starting materials containing heavy metals, e.g. coal, it also contains metal carbonyls, which are carbon monoxide complexes of zero-valent transition metals, as undesirable constituents. Since metal carbonyls would also lead to damage to the gas turbine, they are allowed to be present only in traces in the fuel gas, for which reason they likewise have to be removed from the cracking gas.

Chemical or physicochemical gas scrubs are frequently used for treating the cracking gas since these allow largely complete removal of hydrogen sulphide and of the organic sulphur compounds without significantly reducing the amounts of hydrogen, carbon monoxide and carbon dioxide. However, these processes have the disadvantage that they are not able to scrub out metal carbonyls. Therefore, the metal carbonyls have to be separated from the gas mixture produced in the gas scrub in a further process step.

According to the prior art, the removal of metal carbonyls is carried out by adsorption, with the gas mixture to be treated being passed over a bed consisting of activated carbon on which the metal carbonyls are deposited and accumulated. As soon as the adsorber bed is saturated with metal carbonyls, it is replaced by a fresh bed and subsequently has to be disposed of at high cost as hazardous waste, which has an adverse effect on the economics of fuel gas production.

It is therefore an object of the present invention to provide a process of the above-described type, and also an apparatus for carrying out the process, which allows metal carbonyls to be separated off largely selectively and inexpensively from gas mixtures.

Upon further study of the specification and appended claims, other objects, aspects and advantages of the invention will become apparent.

SUMMARY OF THE INVENTION

These objects are achieved by separating off materials dissolved in the scrubbing medium in the regeneration of the loaded scrubbing medium only to the extent necessary for removal of the metal carbonyls.

A method suitable for use in the process of the invention for separating metal carbonyls from a loaded scrubbing medium is known, for example, from the patent application DE10 2007 055 296, the contents of which are hereby fully incorporated by reference into the present description, where it is disclosed as substep of scrubbing medium regeneration, whose objective is the complete removal of all materials dissolved in the scrubbing medium. In this method, the metal carbonyls are precipitated by heating loaded scrubbing medium to a first temperature at a first pressure which is higher than the vapor pressure of the scrubbing medium and, at a minimum residence time in a separation apparatus, separated off from the loaded scrubbing medium. The scrubbing medium loaded with metal carbonyls is heated to a second temperature at a second pressure which is higher than the first pressure before being heated to the first temperature and is subsequently depressurized, where the second temperature is selected so that metal carbonyls are reliably kept in solution before the depressurization.

Preference is given to the total amount of the regenerated scrubbing medium being reused for separating off metal carbonyls. To compensate for scrubbing medium losses unavoidably occurring in a gas scrub and for amounts of scrubbing medium which may be deliberately taken from the scrubbing process, the amount of regenerated scrubbing medium is supplemented with fresh scrubbing medium, which is normally introduced unloaded from the outside into the scrubbing process, before it is reused in the gas scrub.

Due to the regeneration according to the invention, the scrubbing medium used for the gas scrub is largely free of metal carbonyls and is therefore capable of absorbing these. However, it can be preloaded with at least one material (e.g., carbon dioxide, methane), which likewise is present in the gas mixture to be treated in addition to the metal carbonyls, and which is not separated or separated to only a minor extent from the gas mixture during the gas scrub for this reason. The process of the invention thus allows largely selective removal of the metal carbonyls from the gas mixture to be treated.

A partial amount of the regenerated scrubbing medium can be mixed into the gas mixture to be treated upstream of the metal carbonyl removal in order to bind water present in the gas mixture, which water would freeze out in the gas scrub and lead to blockages if the gas scrub is carried out at temperatures below 0° C. After the introduction of the partial amount of the regenerated scrubbing medium, the gas mixture is cooled in order to condense out the mixture made up of water and scrubbing medium. The mixture water and scrubbing medium is then separated from the gas mixture. The mixture made up of water and scrubbing medium is preferably introduced into a phase separation apparatus in order to recover scrubbing medium which is appropriately reused for separating off metal carbonyls.

Physical gas scrubs exploit the ability of liquids to absorb gaseous materials and keep them in solution without chemically binding the gases. The extent to which a gas is absorbed by a liquid is expressed by the solubility coefficient: the better the gas dissolves in the liquid, the higher is its solubility coefficient. The solubility coefficient is temperature-dependent and generally increases with decreasing temperature.

If a gas component i is to be dissolved out of a gas mixture by physical scrubbing, a minimum amount $W_{min}$ of the liquid used as scrubbing medium is necessary for this purpose; this minimum amount can very readily be calculated by means of the following formula:

$$W_{min} = V/(\rho \cdot \lambda_i)$$

In the formula, V is the total amount of the gas mixture, $\rho$ is the pressure prevailing in the gas mixture and $\lambda_i$ is the solubility coefficient of the gas component to be scrubbed out in the scrubbing medium used.

Owing to their high solubility coefficient, the metal carbonyls can be removed from a gas mixture using a comparatively small minimum amount of scrubbing medium.

The metal carbonyl removal is preferably carried out in a scrubbing column which is configured with trays or/and packing. In the lower part of the scrubbing column the gas stream to be purified is introduced and at the top of the scrubbing column the scrubbing medium is introduced. In order to ensure an irrigation density of the trays or packing which is sufficient for safely avoiding gas breakthroughs, such a column can be operated using only an amount of scrubbing medium which exceeds a minimum value whose magnitude depends on the characteristics of the column and the amount of gas mixture to be scrubbed.

In practice, this can mean that the scrubbing column is operated using a minimum amount of scrubbing medium which is significantly greater than the minimum amount of scrubbing medium required for metal carbonyl removal when the gas scrub is carried out at pressures and temperatures as are known from the prior art.

A preferred variant of the process of the invention provides for the scrubbing column to be operated using an amount of scrubbing medium which is from 0 to 50% greater than the minimum amount of scrubbing medium required for proper operation of the scrubbing column, where the operating temperature of the scrubbing column is selected so that the minimum amount of scrubbing medium required for the metal carbonyl removal approximates the amount of scrubbing medium used. The amount of scrubbing medium used in the scrubbing column is particularly preferably from about 0 to about 50% (e.g., 1% to 50%) greater than the minimum amount of scrubbing medium required for metal carbonyl removal.

To avoid the accumulation of impurities, for example higher hydrocarbons in the circulated scrubbing medium, part of the scrubbing medium which has been loaded in the gas scrub is preferably discharged as purge stream downstream of the regeneration. The purge stream is advantageously introduced for regeneration into the scrubbing medium circuit of a gas scrub which is operated using the same scrubbing medium in parallel to the metal carbonyl removal and whose regeneration apparatus is designed for removal of the materials foreign to the scrubbing medium which are present in the purge stream. However, disposal of the purge stream is also possible.

The process of the invention is suitable for separating metal carbonyls from many gas mixtures. In particular, it can be used to remove metal carbonyls from a gas mixture comprising hydrogen, carbon monoxide and carbon dioxide, with methanol preferably being used as physically acting scrubbing medium.

Furthermore, the invention relates to an apparatus for separating metal carbonyls from a gas mixture, which comprises a scrubbing apparatus, in which a gas mixture can be subjected to scrubbing with a physically acting scrubbing medium and also a regeneration apparatus for regenerating the scrubbing medium, loaded with metal carbonyls in the scrubbing apparatus, where the scrubbing apparatus is connected to the regeneration apparatus in such a way that regenerated scrubbing medium can be recirculated to the scrubbing apparatus for separating off metal carbonyls.

The above object is, in terms of an apparatus, achieved according to the invention by the regeneration apparatus being configured with
 a first heat exchanger, in which scrubbing medium loaded with metal carbonyls can be heated at a first pressure to a first temperature,
 a throttle device, via which the loaded scrubbing medium which has been heated to the first temperature in the first heat exchanger can be depressurized,
 an outgassing apparatus, from which gases liberated in the depressurization of the loaded scrubbing medium and also scrubbing medium loaded with metal carbonyls can be discharged,
 a second heat exchanger, in which scrubbing medium loaded with metal carbonyls from the outgassing apparatus can be heated to a second temperature at a second pressure,
 and also a separation apparatus which is connected to the outlet side of the second heat exchanger and in which the metal carbonyls can decompose at a minimum residence time and be precipitated from the loaded scrubbing medium which has been heated to the second temperature,
where the separation apparatus is connected to the scrubbing apparatus in such a way that scrubbing medium which is free of metal carbonyls from the separation apparatus can be fed directly to the scrubbing apparatus for separating off metal carbonyls.

In this context, "fed directly" means that no further regeneration apparatuses are arranged in the path of the metal carbonyl-free scrubbing medium from the separation apparatus to the scrubbing apparatus.

The scrubbing apparatus is preferably configured as a scrubbing column which has trays or/and packing and into the bottom part of which the gas stream to be purified can be introduced and at the top of which the scrubbing medium can be introduced.

Furthermore, a water removal apparatus is proposed, by means of which water can be separated off from the gas mixture to be purified before the gas mixture is introduced into the scrubbing apparatus. The water removal apparatus comprises an injection device for injecting scrubbing medium into the gas mixture to be purified, a heat exchanger for cooling the gas mixture arranged downstream of the injection device and also a separator for separating off a water/scrubbing medium mixture condensed out during the cooling of the gas mixture, where the top of the separator is connected to the scrubbing apparatus so that the gas mixture which has been separated off can be fed to the scrubbing apparatus. The injection device is advantageously connected to the separation apparatus of the regeneration part in order to be able to use scrubbing medium which has been freed of metal carbonyls for the removal of water. The water removal apparatus preferably comprises a phase separation apparatus into which the water/scrubbing medium mixture from the separator can be introduced in order to separate off water and recover scrubbing medium. The phase separation apparatus is also usefully connected to the scrubbing apparatus so that recovered scrubbing medium can be used for separating off metal carbonyls. The phase separation apparatus is preferably configured as a column having a reboiler for boiling the bottom product and an overhead condenser.

A preferred embodiment of the apparatus of the invention provides an offtake device via which part of the scrubbing medium which has been freed of metal carbonyls in the separation apparatus can be taken off as purge stream in order to prevent accumulation of impurities in the circulated scrubbing medium. The offtake device is particularly preferably connected to the scrubbing medium circuit of a gas scrub which is operated using the same scrubbing medium and parallel to the apparatus for separating off metal carbonyls and whose regeneration apparatus is designed for removal of the materials which are foreign to the scrubbing medium present in the purge stream. The offtake device can also be designed for introducing the purge stream into a disposal facility.

The apparatus of the invention can be configured as part of a larger gas scrub or as independent gas scrub. It is particularly suitable for supplementing an existing gas scrub in which metal carbonyls cannot be separated off or can be separated off only incompletely.

BRIEF DESCRIPTION OF THE DRAWINGS

The process and apparatus according to the invention for separating metal carbonyls from a gas mixture by gas scrubbing with a physically acting scrubbing medium and further advantageous embodiments of the same will be described in more detail hereinafter with reference to the exemplary embodiment schematically illustrated in FIG. 1.

FIG. 1 shows an apparatus in which metal carbonyls are separated from a gas mixture, with methanol being used as physically acting scrubbing medium.

From a first gas scrub (not shown) in which sulphur components are separated off largely selectively from a cracking gas, a gas mixture produced therein and consisting predominantly of hydrogen, carbon monoxide and carbon oxide, water and metal carbonyls is fed via line 1 to the second gas scrub G for separating off metal carbonyls. To prevent water from freezing under the conditions prevailing in the metal carbonyl removal and leading to blockages, methanol is supplied via line 2 and injected into the gas mixture 1. As a result of the cooling occurring in the heat exchanger E1, a methanol/water mixture condenses out, so that a two-phase mixture 3 is introduced into the separator D and can be separated there into a liquid phase 4 consisting of water and scrubbing medium and a water-free gas phase 5. The gas phase 5 is introduced into the lower part of the scrubbing column W where it flows upwards and at the same time is intensively mixed with methanol 6 which is introduced as scrubbing medium at the top of the column W. The methanol absorbs the metal carbonyls present in the gas mixture 5 here, so that a gas mixture which is largely free of metal carbonyls can be taken off via line 7 and, for example, fed as fuel to a gas turbine. Loaded methanol is taken off from the bottom region of the scrubbing column W at a pressure of about 60 bar via line 8, introduced into the heat exchanger E2 and heated there to about 70° C. The heated methanol loaded with methanol carbonyls is conveyed via line 9 to the throttle device a in order to be depressurized to a pressure of about 3 bar into the outgassing apparatus A arranged in the upper part of the vessel B. In the outgassing apparatus A, carbon monoxide, which is likewise absorbed but to a lesser extent by the methanol during the gas scrub, is flashed off from the loaded methanol scrubbing medium and taken off via line 10. The now virtually CO-free methanol scrubbing medium which, however, still contains metal carbonyls is conveyed via line 11 into the heat exchanger E3, heated there to a temperature of at least 90° C. and subsequently fed via line 12 into the separation apparatus F which is filled with an iron-containing packing C and is arranged in the lower part of the column B; in this separation apparatus F, the metal carbonyls decompose into metal ions and carbon monoxide at relatively low residual CO pressure. The CO liberated in the decomposition of the metal carbonyls flows via the chimney tray K into the outgassing column A and is conveyed further together with the CO flashed off from the loaded methanol 9 via line 10. On the other hand, the metal ions become bound to the iron of the packing P which is, for example, configured as a bed of shaped iron parts. It is ensured by means of a sufficiently long residence time of the methanol in the separation apparatus B that the metal ions have sufficient time to become bound to the iron in order to be separated off completely from the methanol. The methanol which has been freed of metal carbonyls but is still preloaded with carbon dioxide is taken off via line 13 from the separation apparatus F, cooled in the heat exchanger E4 and passed on via line 14 with the aid of the pump P. Part of the methanol is recirculated via line 6 to the top of the scrubbing column W in order to be reused as scrubbing medium, while another part 2 is used for separating off water from the gas mixture 1 to be purified.

In order to avoid accumulation of impurities, for example higher hydrocarbons, in the circulated scrubbing medium, a small part 15 of the metal carbonyl-free methanol is discharged as purge stream and, for example, introduced for regeneration in a gas scrub (not shown) which is likewise operated using methanol and is operated in parallel to the metal carbonyl removal. To compensate for unavoidable loses of scrubbing medium and of the purge stream 15, fresh methanol is introduced via line 16 into the scrubbing medium circuit.

The methanol/water mixture 3 from the separator D is fed, in order to recover the methanol, to the separation column T from which wastewater 17 and methanol 18 are obtained. While the wastewater 17 is disposed of, the methanol 18 is recirculated to the scrubbing medium circuit, for example, by connecting column T directly to scrubbing column W or line 13.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding German patent application DE 10 2013 010 103.4, filed Jun. 18, 2013, are incorporated by reference herein.

The invention claimed is:

1. A process for separating metal carbonyls from a gas mixture (1) comprising:
   scrubbing the gas mixture with a physically acting scrubbing medium (6) in a gas scrubber (W) during which materials including metal carbonyls are dissolved into the scrubbing medium, thereby generating a loaded scrubbing medium loaded with materials including metal carbonyls, and regenerating said loaded scrubbing medium (8), and subsequently reusing at least a portion of the regenerated scrubbing medium in said gas scrubber for removing metal carbonyls from said gas mixture, wherein said at least a portion of the regenerated scrubbing medium is fed directly from the regeneration to the gas scrubber, wherein, in the regeneration of said loaded scrubbing medium (8), materials dissolved in the scrubbing medium are separated off from the scrubbing medium, and the regeneration is performed only until metal carbonyls dissolved in the loaded scrubbing medium are removed.

2. The process according to claim 1, wherein, during regeneration of the loaded scrubbing medium (8), metal carbonyls are precipitated by heating (E3) of the loaded scrubbing medium (11) to a first temperature at a first pressure which is higher than the vapor pressure of the scrubbing medium and then separated off from the loaded scrubbing medium in a separation apparatus (F), and wherein the scrubbing medium (8) loaded with metal carbonyls is heated to a second temperature (E2) at a second pressure, which is higher than the first pressure, before being heated to the first temperature and is subsequently depressurized (a), where the second temperature is selected so that metal carbonyls are reliably kept in solution before the depressurization (a).

3. The process according to claim 1, wherein all of the regenerated scrubbing medium is reused for separating off metal carbonyls.

4. The process according to claim 1, wherein said gas scrubber (W) is operated using an amount of scrubbing medium which is from 0 to 50% greater than the minimum amount of scrubbing medium required for metal carbonyl removal in said gas scrubber (W), and the operating temperature of said gas scrubber (W) is selected so that the minimum amount of scrubbing medium required for metal carbonyl removal approximates the amount of scrubbing medium used.

5. The process according to claim 1, wherein methanol is used as said scrubbing medium (6).

6. The process according to claim 1, wherein the gas mixture (1) to be freed of metal carbonyls comprises water, carbon dioxide and also carbon monoxide and/or hydrogen.

7. The process according to claim 1, wherein, upstream of the scrubber, said process further comprises mixing a partial amount of regenerated scrubbing medium into the gas mixture to remove water therefrom, cooling the gas mixture, and separating water and scrubbing medium from the gas mixture.

8. The process according to claim 1, wherein said gas scrubber (W) is operated using an amount of scrubbing medium which is from 0 to 50% greater than the minimum amount of scrubbing medium required for metal carbonyl removal in said gas scrubber (W), wherein the minimum amount of scrubbing medium required for metal carbonyl removal is defined by the equation $W_{min}=V/(p \cdot \lambda_i)$ in which $W_{min}$ is the minimum amount of scrubbing medium required for metal carbonyl removal, V is the total amount of the gas mixture, p is the pressure prevailing in the gas mixture, and $\lambda_i$ is the solubility coefficient of metal carbonyls.

9. A process for separating metal carbonyls from a gas mixture (1) comprising:

scrubbing the gas mixture in a scrubbing column (W) with a physically acting scrubbing medium (6) during which materials including metal carbonyls are dissolved into the scrubbing medium, thereby generating a loaded scrubbing medium loaded with materials including metal carbonyls, regenerating said loaded scrubbing medium (8) to produce a regenerated scrubbing medium, wherein materials dissolved in the loaded scrubbing medium are separated off from the scrubbing medium, and the regeneration is performed only until metal carbonyls dissolved in the loaded scrubbing medium are removed, and subsequently using at least a portion of the regenerated scrubbing medium in said scrubbing column (W) to separate metal carbonyls from said gas mixture, wherein said at least a portion of the regenerated scrubbing medium is fed directly from the regeneration to scrubbing column (W).

10. The process according to claim 9, wherein said gas mixture contains carbon monoxide and methanol is the scrubbing medium in said scrubbing column, and the loaded scrubbing medium is regenerated by being heated in a first heat exchanger (E2), depressurized in a throttle device, degassed in a outgassing apparatus (A) wherein carbon monoxide is flashed off, heated in a second heat exchanger (E3), and fed to a separation apparatus (F) filled with an iron-containing packing wherein the metal carbonyls decompose into metal ions and carbon monoxide.

11. The process according to claim 10, wherein the loaded scrubbing medium is heated in said first heat exchanger to a first temperature whereby the metal carbonyls are kept in solution before the depressurization in said in a throttle device, and the loaded scrubbing medium is heated in said second heat exchanger, at a pressure which is higher than the vapor pressure of the scrubbing medium, to a temperature whereby the metal carbonyls are precipitated.

12. The process according to claim 10, wherein said outgassing apparatus (A) is arranged in an upper part of a column (B) and said separation apparatus (F) filled with an iron-containing packing is arranged in a lower part of said column (B), and carbon monoxide liberated in the decomposition of said metal carbonyls in said separation apparatus (F) flows from said separation apparatus (F) via a chimney tray (K) into said outgassing column (A).

13. The process according to claim 11, wherein said outgassing apparatus (A) is arranged in an upper part of a column (B) and said separation apparatus (F) filled with an iron-containing packing is arranged in a lower part of said column (B), and carbon monoxide liberated in the decomposition of said metal carbonyls in said separation apparatus (F) flows from said separation apparatus (F) via a chimney tray (K) into said outgassing column (A).

* * * * *